United States Patent
Liu et al.

(10) Patent No.: US 11,703,599 B2
(45) Date of Patent: Jul. 18, 2023

(54) PARTIAL POINT CLOUD-BASED PEDESTRIANS' VELOCITY ESTIMATION METHOD

(71) Applicants: Baidu USA LLC, Sunnyvale, CA (US); Baidu.com Times Technology (Beijing) Co., Ltd., Beijing (CN)

(72) Inventors: Xiang Liu, Beijing (CN); Bin Gao, Beijing (CN); Fan Zhu, Beijing (CN)

(73) Assignees: BAIDU USA LLC, Sunnyvale, CA (US); BAIDU.COM TIMES TECHNOLOGY (BEIJING) CO., LTD, Beijing (CN)

( * ) Notice: Subject to any disclaimer, the term of this patent is extended or adjusted under 35 U.S.C. 154(b) by 612 days.

(21) Appl. No.: 16/771,312

(22) PCT Filed: May 15, 2020

(86) PCT No.: PCT/CN2020/090419
§ 371 (c)(1),
(2) Date: Jun. 10, 2020

(87) PCT Pub. No.: WO2021/226980
PCT Pub. Date: Nov. 18, 2021

(65) Prior Publication Data
US 2021/0356599 A1 Nov. 18, 2021

(51) Int. Cl.
*G01S 17/931* (2020.01)
*G06T 7/20* (2017.01)
(Continued)

(52) U.S. Cl.
CPC ....... *G01S 17/931* (2020.01); *B60W 60/0011* (2020.02); *G01S 7/4802* (2013.01);
(Continued)

(58) Field of Classification Search
CPC ........ G01V 20/56; G01V 20/10; G01V 10/25; G06T 7/20; G01S 17/58; G01S 17/42;
(Continued)

(56) References Cited

U.S. PATENT DOCUMENTS 11,074,438 B2 * 7/2021 Mangalam ........... G06V 40/103
11,282,389 B2 * 3/2022 Khadloya ............... G06F 18/24
(Continued)

*Primary Examiner* — Yazan A Soofi
(74) *Attorney, Agent, or Firm* — Womble Bond Dickinson (US) LLP

(57) ABSTRACT

A method, apparatus, and system for estimating a moving speed of a detected pedestrian at an autonomous driving vehicle (ADV) is disclosed. A pedestrian is detected in a plurality of frames of point clouds generated by a LIDAR device installed at an autonomous driving vehicle (ADV). In each of at least two of the plurality of frames of point clouds, a minimum bounding box enclosing points corresponding to the pedestrian excluding points corresponding to limbs of the pedestrian is generated. A moving speed of the pedestrian is estimated based at least in part on the minimum bounding boxes across the at least two of the plurality of frames of point clouds. A trajectory for the ADV is planned based at least on the moving speed of the pedestrian. Thereafter, control signals are generated to drive the ADV based on the planned trajectory.

20 Claims, 8 Drawing Sheets

(51) Int. Cl.
   *G01S 17/42* (2006.01)
   *G01S 7/48* (2006.01)
   *G01S 17/58* (2006.01)
   *B60W 60/00* (2020.01)
   *G01S 17/00* (2020.01)
   *G06V 10/25* (2022.01)
   *G06V 20/10* (2022.01)
   *G06V 20/56* (2022.01)

(52) U.S. Cl.
   CPC .............. *G01S 17/00* (2013.01); *G01S 17/42* (2013.01); *G01S 17/58* (2013.01); *G06T 7/20* (2013.01); *G06V 10/25* (2022.01); *G06V 20/10* (2022.01); *G06V 20/56* (2022.01); *B60W 2420/52* (2013.01); *B60W 2554/4029* (2020.02); *G06T 2207/10028* (2013.01); *G06T 2207/30196* (2013.01); *G06T 2207/30241* (2013.01); *G06T 2207/30252* (2013.01)

(58) Field of Classification Search
   CPC ...... G01S 17/00; G01S 7/4802; G01S 17/931; B60W 60/0011
   USPC .......................................................... 701/26
   See application file for complete search history.

(56) References Cited

U.S. PATENT DOCUMENTS

| | | | |
|---|---|---|---|
| 11,460,857 B1* | 10/2022 | Tan | G06N 20/00 |
| 11,518,413 B2* | 12/2022 | Anthony | G06V 10/7788 |
| 11,521,010 B2* | 12/2022 | Caesar | G06N 3/045 |
| 2015/0161796 A1* | 6/2015 | Choi | G06V 20/58 348/77 |
| 2018/0307944 A1* | 10/2018 | Li | G01S 7/4802 |

* cited by examiner

PARTIAL POINT CLOUD-BASED PEDESTRIANS' VELOCITY ESTIMATION METHOD

CROSS-REFERENCE TO RELATED APPLICATION

This patent application is a U.S. National Phase Application under 35 U.S.C. § 371 of International Application No. PCT/CN2020/090419, filed May 15, 2020, entitled "A PARTIAL POINT CLOUD-BASED PEDESTRIANS' VELOCITY ESTIMATION METHOD," which is incorporated by reference herein by its entirety.

TECHNICAL FIELD

Embodiments of the present disclosure relate generally to operating autonomous driving vehicles. More particularly, embodiments of the disclosure relate to object speed estimation in the operation of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

LIDAR (Light Detection and Ranging, or a portmanteau of light and radar) techniques have been widely utilized in military, geography, oceanography, and in the latest decade, autonomous driving vehicles. A LIDAR device can estimate a distance to an object while scanning through a scene to assemble a point cloud representing a reflective surface of the object. Individual points in the point cloud can be determined by transmitting a laser pulse and detecting a returning pulse, if any, reflected from the object, and determining the distance to the object according to the time delay between the transmitted pulse and the reception of the reflected pulse. A laser or lasers, can be rapidly and repeatedly scanned across a scene to provide continuous real-time information on distances to reflective objects in the scene. Each full rotation of one laser beam produces one ring of points.

LIDAR points-based pedestrian speed estimation is known in the art. Conventionally, a minimum bounding box is constructed for the LIDAR points corresponding to the pedestrian across at least two frames of point clouds (e.g., the current frame and the immediately previous frame). The moving speed of the pedestrian can be estimated based on the differences between the minimum bounding boxes across the frames. However, less than ideal minimum bounding boxes for the purpose of speed estimation may result due to the pedestrian's constantly changing body posture when he or she is moving. Accordingly, errors in the minimum bounding box-based speed estimation may also result.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
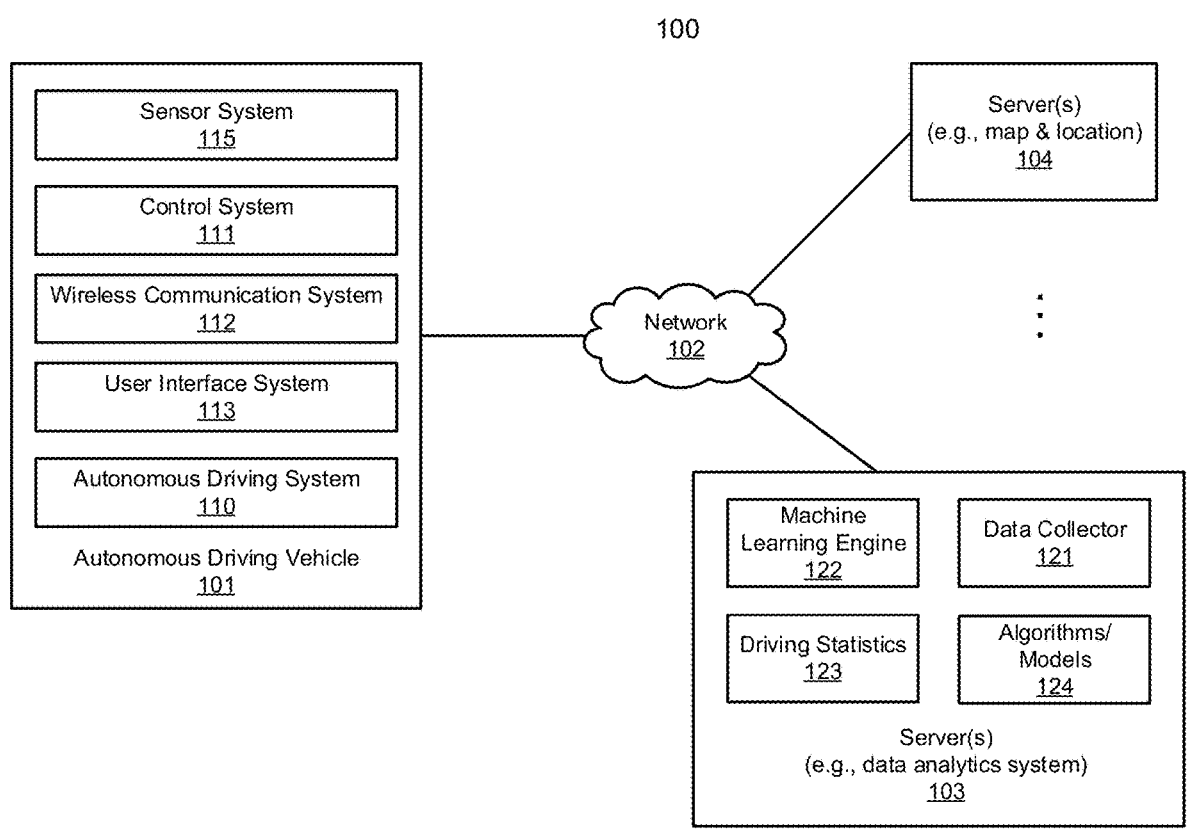
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A method, apparatus, and system for estimating a moving speed of a detected pedestrian at an autonomous driving vehicle (ADV) is disclosed. According to some embodiments, a pedestrian is detected in a plurality of frames of point clouds generated by a LIDAR device installed at an autonomous driving vehicle (ADV). In each of at least two of the plurality of frames of point clouds, a minimum bounding box enclosing points corresponding to the pedestrian excluding points corresponding to limbs of the pedestrian is generated. A moving speed of the pedestrian is estimated based at least in part on the minimum bounding boxes across the at least two of the plurality of frames of point clouds. A trajectory for the ADV is planned based at least on the moving speed of the pedestrian. Thereafter, control signals are generated to drive the ADV based on the planned trajectory.

In one embodiment, in each of the at least two of the plurality of frames of point clouds, to generate the minimum bounding box enclosing the points corresponding to the pedestrian excluding points corresponding to limbs of the pedestrian, the points corresponding to the pedestrian are filtered to remove lower points and keep only higher points. It should be appreciated that the lower points correspond to legs and feet of the pedestrian. The remaining higher points in the points corresponding to the pedestrian are projected to a horizontal plane.

A principal axis associated with the projected higher points on the horizontal plane is determined. The projected higher points on the horizontal plane are further projected to the principal axis. The twice-projected higher points are filtered to remove most outlying points in both directions of the principal axis. It should be appreciated that the most outlying points correspond to arms and hands of the pedestrian. A subset of points in the points corresponding to the pedestrian that correspond to the remaining twice-projected higher points are determined. Thereafter, a minimum bounding box enclosing the subset of points is generated. It should be appreciated that the minimum bounding box enclosing the subset of points is the minimum bounding box enclosing the points corresponding to the pedestrian excluding points corresponding to limbs of the pedestrian.

In one embodiment, filtering the points corresponding to the pedestrian to remove lower points and keep only higher points comprises removing points whose height differences with respect to a highest point in the points corresponding to the pedestrian are above a first threshold. In one embodiment, the first threshold is approximately 0.6 meter (m).

In one embodiment, determining a principal axis associated with the projected higher points comprises performing a singular value decomposition (SVD) or an eigenvalue decomposition on a covariance matrix.

In one embodiment, filtering the twice-projected higher points to remove most outlying points in both directions of the principal axis comprises removing points whose distances to a centroid of the twice-projected higher points are above a second threshold.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
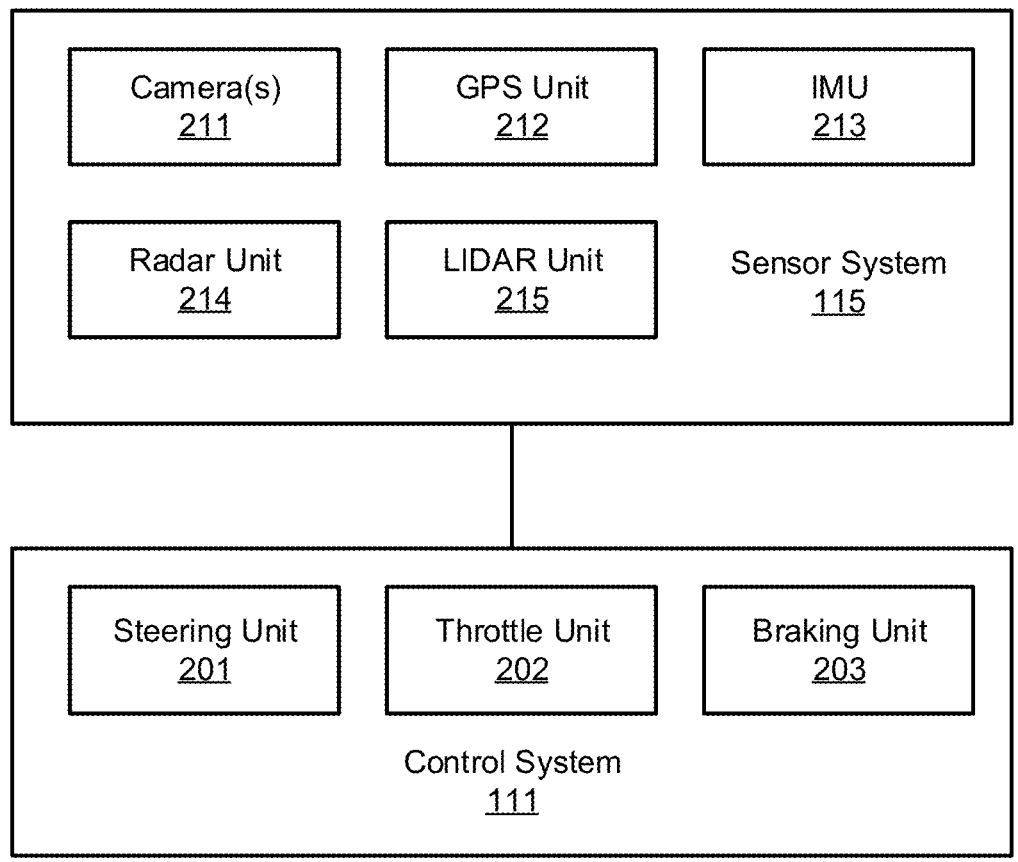
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 include an algorithm to determine a velocity of a pedestrian using LIDAR point clouds. Algorithms 124 can then be uploaded on ADVs to be utilized during autonomous driving in real-time.

Figure 3A:
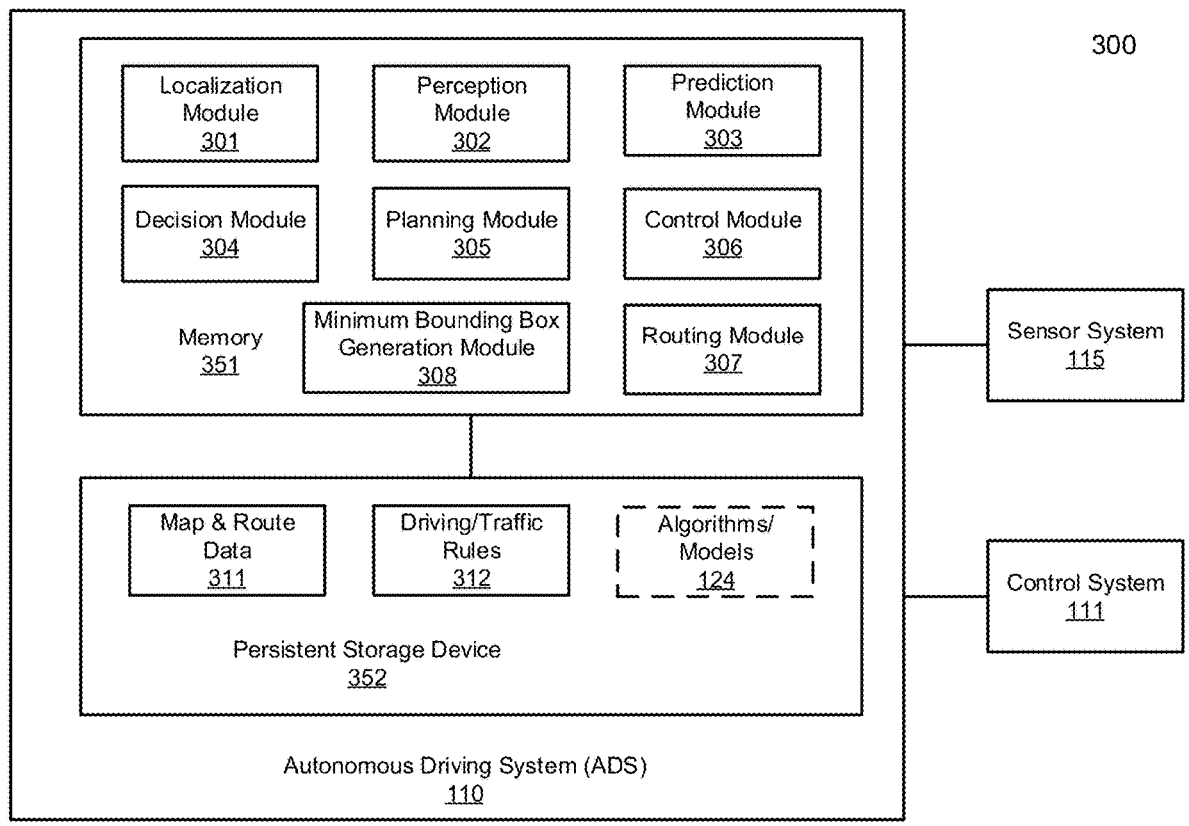
FIGS. 3A-3B are block diagrams illustrating an example of an autonomous driving system used with an autonomous driving vehicle according to one embodiment.
Figure 3B:
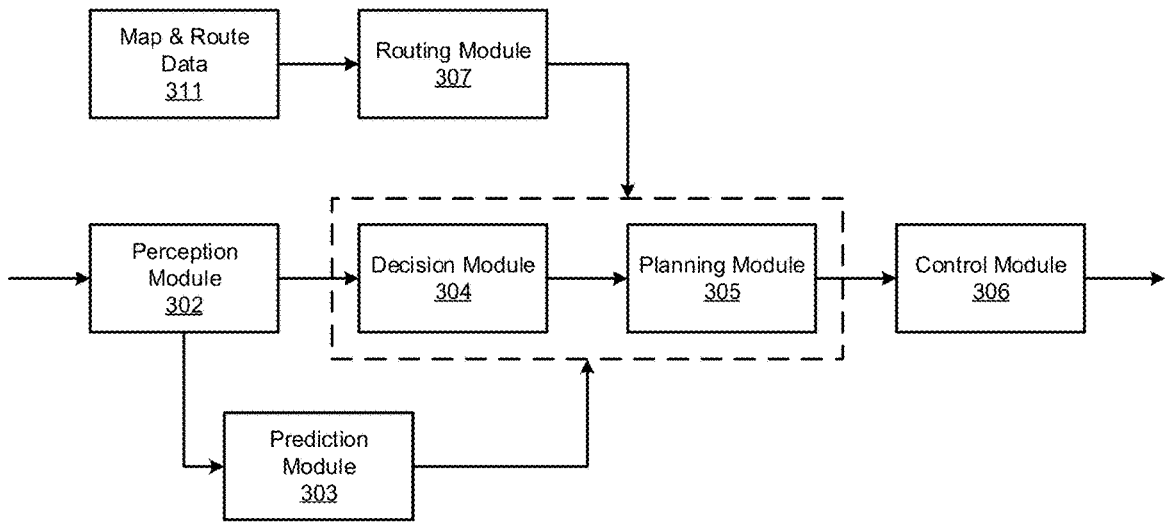

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, minimum bounding box generation module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
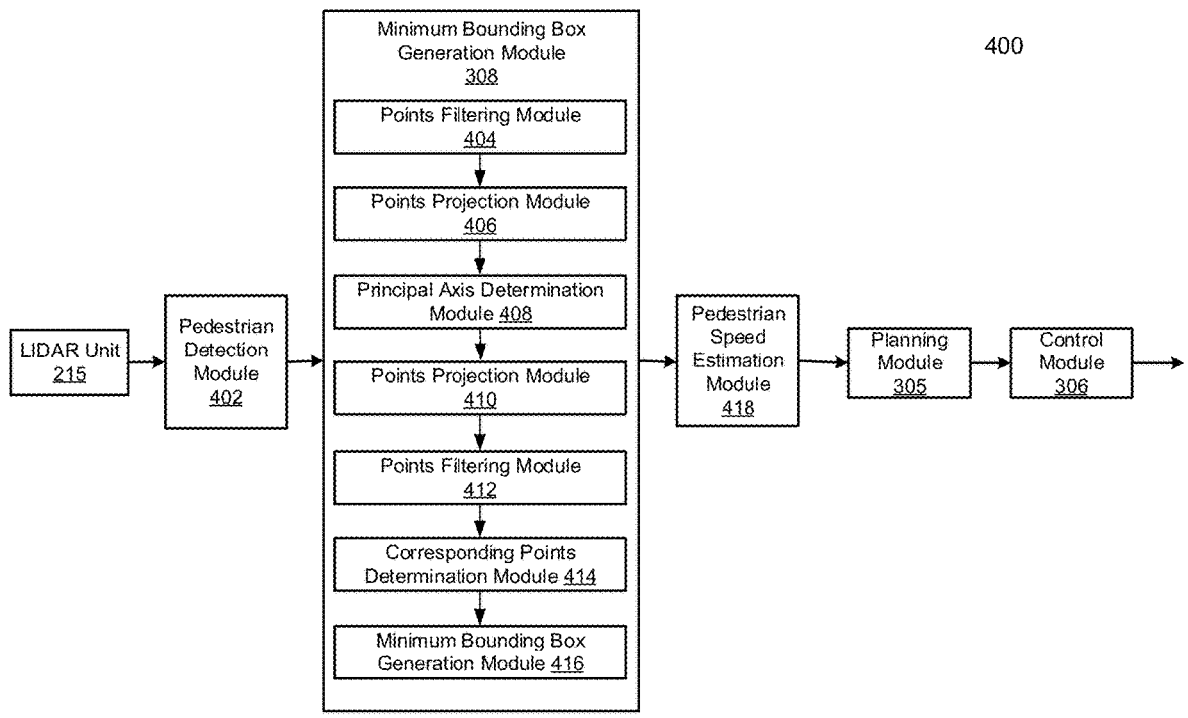
FIG. 4 is a block diagram illustrating various modules utilized in the estimation of a moving speed of a detected pedestrian at an autonomous driving vehicle (ADV) according to one embodiment.

Referring to FIG. 4, a block diagram 400 illustrating various modules utilized in the estimation of a moving speed of a detected pedestrian at an autonomous driving vehicle (ADV) according to one embodiment is shown. A pedestrian is detected at a pedestrian detection module 402 in a plurality of frames of point clouds generated by a LIDAR device 215 installed at an autonomous driving vehicle (ADV) 101. In each of at least two of the plurality of frames of point clouds, a minimum bounding box enclosing points corresponding to the pedestrian excluding points corresponding to limbs of the pedestrian is generated at the minimum bounding box generation module 308. A moving speed of the pedestrian is estimated at a pedestrian speed estimation module 418 based at least in part on the minimum bounding boxes across the at least two of the plurality of frames of point clouds.

Techniques for estimating a pedestrian's moving speed based on minimum bounding boxes across two or more frames of point clouds are well known in the art. Because the points corresponding to the pedestrian's torso and head are more stable than points corresponding to the whole pedestrian when the pedestrian is moving (e.g., walking or running), estimating the moving speed of the pedestrian based on minimum bounding boxes enclosing points corresponding to the pedestrian excluding points corresponding to limbs of the pedestrian is preferable to estimating the speed based on minimum bounding boxes enclosing all points corresponding to the pedestrian, and may lead to more accurate speed estimates. A trajectory for the ADV 101 is planned at the planning module 305 based at least on the moving speed of the pedestrian. Thereafter, control signals are generated at the control module 306 to drive the ADV 101 based on the planned trajectory.

In one embodiment, in each of the at least two of the plurality of frames of point clouds, to generate the minimum bounding box enclosing the points corresponding to the pedestrian excluding points corresponding to limbs of the pedestrian, within the minimum bounding box generation module 308, the points corresponding to the pedestrian are filtered at a points filtering module 404 to remove lower points and keep only higher points. It should be appreciated that the lower points correspond to legs and feet of the pedestrian. In one embodiment, filtering the points corresponding to the pedestrian to remove lower points and keep only higher points comprises removing points whose height differences with respect to a highest point in the points corresponding to the pedestrian are above a first threshold.

In one embodiment, the first threshold is approximately 0.6 meter (m). The remaining higher points in the points corresponding to the pedestrian are projected to a horizontal plane at a points projection module 406. A principal axis associated with the projected higher points on the horizontal plane is determined at a principal axis determination module 408. A principal axis, also known as a first principal component, may be a line that minimizes the average squared distances from a set of points to the line. It should be appreciated that when determined with respect to the projected higher points associated with a pedestrian, the principal axis should approximately correspond to a line extending along a left-right direction with respect to the pedestrian. Techniques for determining the principal axis are well known in the art. In one embodiment, determining a principal axis associated with the projected higher points comprises performing a singular value decomposition (SVD) or an eigenvalue decomposition on a covariance matrix.

The projected higher points on the horizontal plane are further projected to the principal axis at a points projection module 410. The twice-projected higher points are filtered at a points filtering module 412 to remove most outlying points in both directions of the principal axis. It should be appreciated that the most outlying points correspond to arms and hands of the pedestrian. In one embodiment, filtering the twice-projected higher points to remove most outlying points in both directions of the principal axis comprises removing points whose distances to a centroid of the twice-projected higher points are above a second threshold. A subset of points in the points corresponding to the pedestrian that correspond to the remaining twice-projected higher points are determined at a corresponding points determination module 414. Thereafter, a minimum bounding box enclosing the subset of points is generated at a minimum bounding box generation module 416. It should be appreciated that the minimum bounding box enclosing the subset of points is the minimum bounding box enclosing the points corresponding to the pedestrian excluding points corresponding to limbs of the pedestrian.

It should be appreciated that in other embodiments, the techniques described hereinafter may be adapted for estimating the speed of the pedestrian based on minimum bounding boxes enclosing only points corresponding to the head of the pedestrian, or alternatively only points corresponding to the torso of the pedestrian. Note that some of all of the modules as shown in FIG. 4 may be integrated into fewer number of modules or a single module. Minimum bounding box generation module 308 may be implemented as a part of perception module 302.

Figure 5:
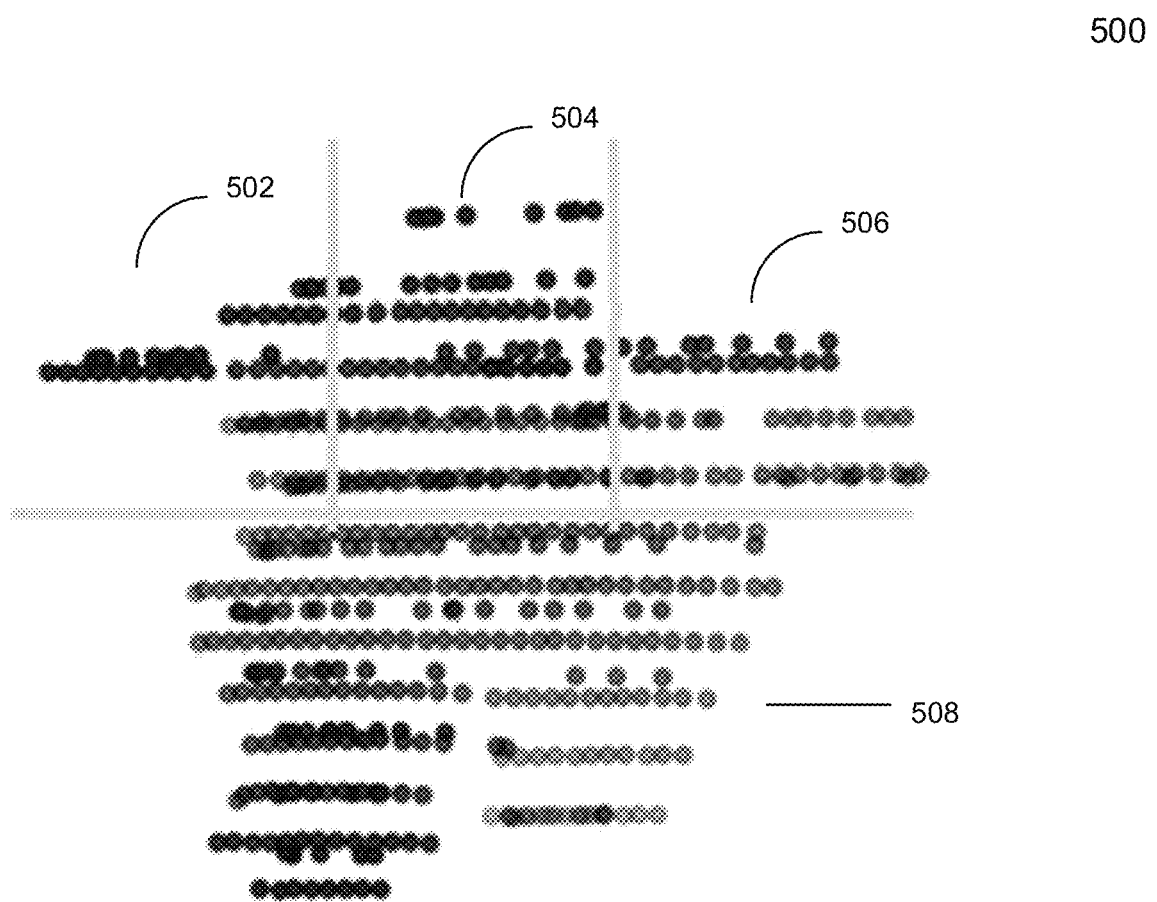
FIG. 5 is an example diagram illustrating LIDAR points corresponding to a pedestrian within one frame of point clouds according to one embodiment.

Referring to FIG. 5, an example diagram 500 illustrating LIDAR points corresponding to a pedestrian within one frame of point clouds according to one embodiment is shown. As shown in FIG. 5, the points corresponding to the pedestrian comprise points corresponding to different parts of the pedestrian. In particular, points 508 (i.e., lower points) correspond to legs and feet of the pedestrian. Points 502, 506 correspond to arms and hands of the pedestrian. Points of interest 504 according to embodiments correspond to the head and the torso of the pedestrian. Because points 504 are more stable and more representative of the general movement of the pedestrian than other points (including points 502, 506, 508), it is preferable to estimate the moving speed of the pedestrian based on minimum bounding boxes enclosing only points of interest 504.

Figure 6A:
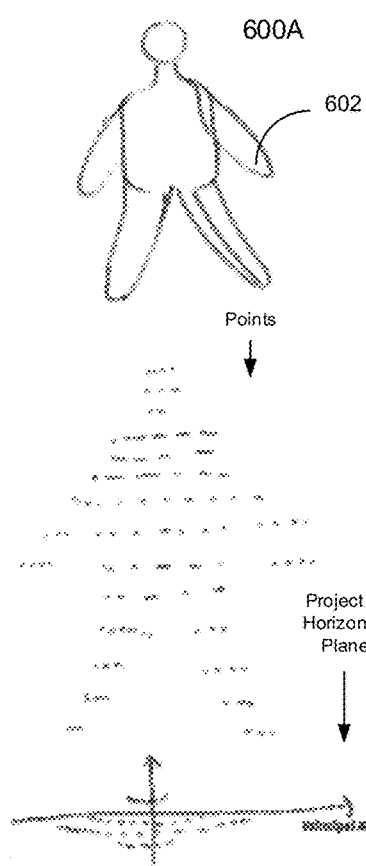
FIGS. 6A-C are diagrams illustrating views of a pedestrian from different angles and the respective LIDAR points corresponding to the pedestrian according to one embodiment.
Figure 6B:
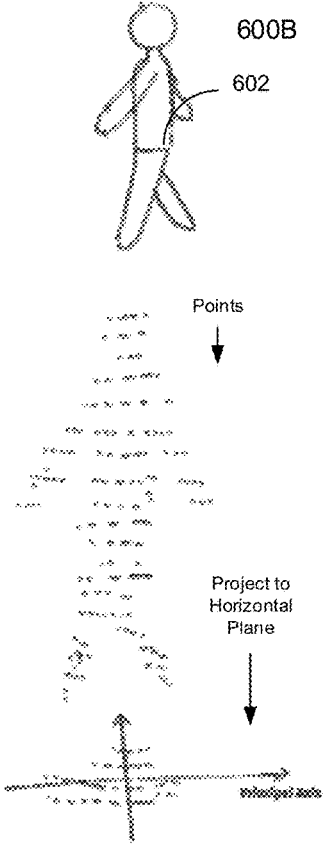
Figure 6C:
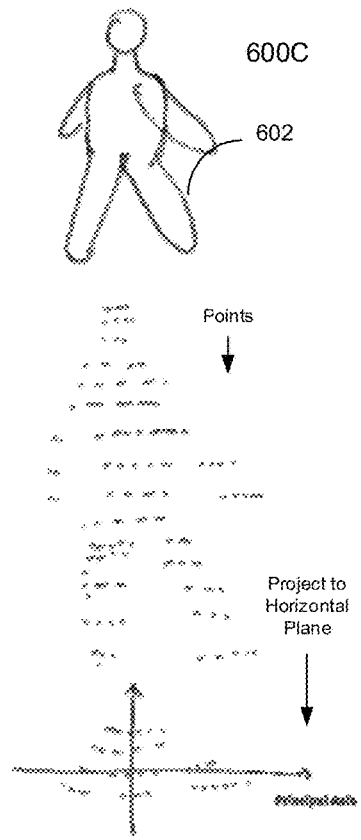

Referring to FIGS. 6A-C, diagrams 600A-C illustrating views of a pedestrian from different angles and the respective LIDAR points corresponding to the pedestrian according to one embodiment are shown. Each of the FIGS. 6A-C comprises a view of the pedestrian 602 from a particular angle, the respective set of LIDAR points corresponding to the pedestrian 602 viewed from the angle, and the same set of points as projected to a horizontal plane and overlaid with a coordinate system based on the principal axis. In particular, FIG. 6A illustrates a front view of the pedestrian, FIG. 6B a side view, and FIG. 6C an oblique view. It should be appreciated from FIGS. 6A-C that no matter the view, the principal axis determined based on the projected points consistently extends along a left-right direction with respect to the pedestrian. Accordingly, it should be further appreciated that the method for estimating a moving speed of the pedestrian as described hereinafter should work equally well irrespective of the angle from which the pedestrian is perceived by the LIDAR.

Figure 7:
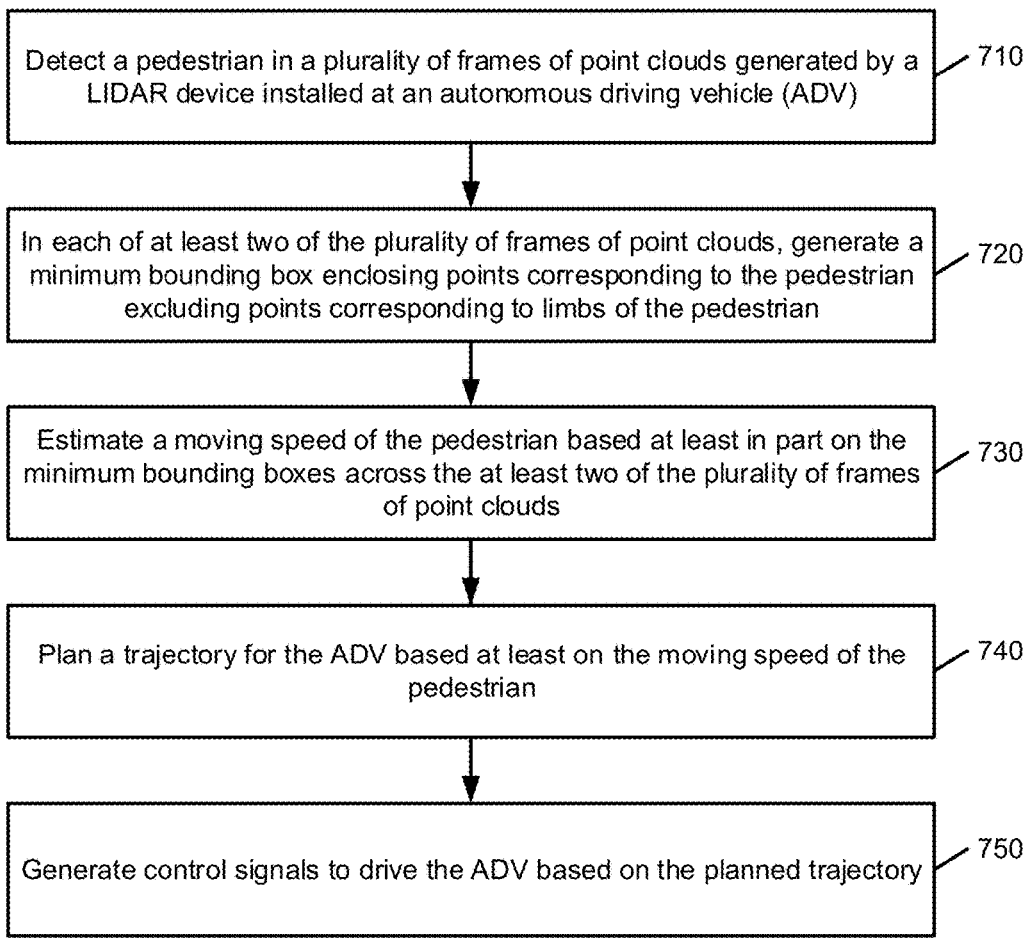
FIG. 7 is a flowchart illustrating an example method for estimating a moving speed of a detected pedestrian at an autonomous driving vehicle (ADV) according to one embodiment.

Referring to FIG. 7, a flowchart illustrating an example method 700 for estimating a moving speed of a detected pedestrian at an autonomous driving vehicle (ADV) according to one embodiment is shown. At block 710, a pedestrian is detected in a plurality of frames of point clouds generated by a LIDAR device installed at an autonomous driving vehicle (ADV). At block 720, in each of at least two of the plurality of frames of point clouds, a minimum bounding box enclosing points corresponding to the pedestrian excluding points corresponding to limbs of the pedestrian is generated. At block 730, a moving speed of the pedestrian is estimated based at least in part on the minimum bounding boxes across the at least two of the plurality of frames of point clouds. At block 740, a trajectory for the ADV is planned based at least on the moving speed of the pedestrian. Thereafter, at block 750, control signals are generated to drive the ADV based on the planned trajectory.

Figure 8:
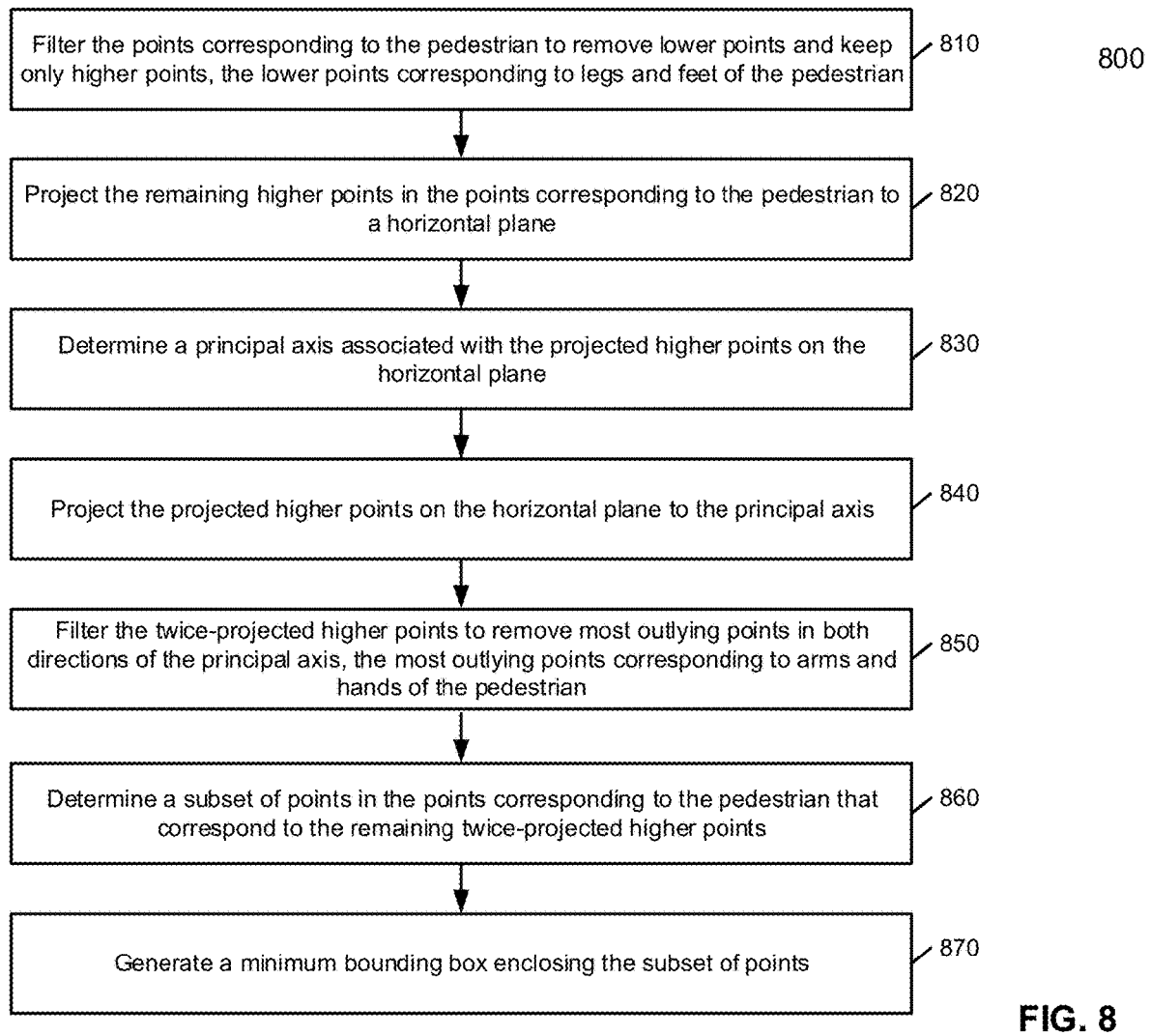
FIG. 8 is a flowchart illustrating an example method for generating the minimum bounding box enclosing the points corresponding to the pedestrian excluding points corresponding to limbs of the pedestrian according to one embodiment.

Referring to FIG. 8, a flowchart illustrating an example method 800 for generating the minimum bounding box enclosing the points corresponding to the pedestrian excluding points corresponding to limbs of the pedestrian according to one embodiment is shown. At block 810, the points corresponding to the pedestrian are filtered to remove lower points and keep only higher points. It should be appreciated that the lower points correspond to legs and feet of the pedestrian. At block 820, the remaining higher points in the points corresponding to the pedestrian are projected to a horizontal plane. At block 830, a principal axis associated with the projected higher points on the horizontal plane is determined. At block 840, the projected higher points on the horizontal plane are further projected to the principal axis. At block 850, the twice-projected higher points are filtered to remove most outlying points in both directions of the principal axis. It should be appreciated that the most outlying points correspond to arms and hands of the pedestrian. At block 860, a subset of points in the points corresponding to the pedestrian that correspond to the remaining twice-projected higher points are determined. Thereafter, at block 870, a minimum bounding box enclosing the subset of points is generated. It should be appreciated that the minimum bounding box enclosing the subset of points is the minimum bounding box enclosing the points corresponding to the pedestrian excluding points corresponding to limbs of the pedestrian.

In one embodiment, filtering the points corresponding to the pedestrian to remove lower points and keep only higher points comprises removing points whose height differences with respect to a highest point in the points corresponding to the pedestrian are above a first threshold. In one embodiment, the first threshold is approximately 0.6 meter (m).

In one embodiment, determining a principal axis associated with the projected higher points comprises performing a singular value decomposition (SVD) or an eigenvalue decomposition on a covariance matrix.

In one embodiment, filtering the twice-projected higher points to remove most outlying points in both directions of the principal axis comprises removing points whose distances to a centroid of the twice-projected higher points are above a second threshold.

Therefore, embodiments of the disclosure relate to LIDAR points-based estimation of the speed of a pedestrian where minimum bounding boxes enclosing points corresponding to the pedestrian excluding the points corresponding to the limbs of the pedestrian are utilized in the speed estimation. Because the head and the torso of the pedestrian is more stable than the limbs when the pedestrian is moving, more accurate speed estimates can be obtained by utilizing the embodiments described herein.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   detecting a pedestrian in a plurality of frames of point clouds generated by a LIDAR device installed at an autonomous driving vehicle (ADV);
   in each of at least two of the plurality of frames of point clouds, generating a minimum bounding box enclosing points corresponding to the pedestrian and excluding points corresponding to limbs of the pedestrian;

estimating a moving speed of the pedestrian based at least in part on the minimum bounding boxes across the at least two of the plurality of frames of point clouds;

planning a trajectory for the ADV based at least on the moving speed of the pedestrian; and generating control signals to drive the ADV based on the planned trajectory.

2. The method of claim 1, wherein generating the minimum bounding box enclosing the points corresponding to the pedestrian and excluding points corresponding to limbs of the pedestrian further comprises:

filtering the points corresponding to the pedestrian to remove lower points and retain only higher points, the lower points corresponding to legs and feet of the pedestrian;

projecting the remaining higher points in the points corresponding to the pedestrian to a horizontal plane; and determining a principal axis associated with the projected higher points on the horizontal plane.

3. The method of claim 2, further comprising:

projecting the projected higher points on the horizontal plane to the principal axis; and filtering the twice-projected higher points to remove most outlying points in both directions of the principal axis, the most outlying points corresponding to arms and hands of the pedestrian.

4. The method of claim 3, further comprising:

determining a subset of points in the points corresponding to the pedestrian that correspond to the remaining twice-projected higher points; and generating a minimum bounding box enclosing the subset of points, the minimum bounding box enclosing the subset of points being the minimum bounding box enclosing the points corresponding to the pedestrian and excluding points corresponding to limbs of the pedestrian.

5. The method of claim 3, wherein filtering the twice-projected higher points to remove most outlying points in both directions of the principal axis comprises removing points whose distances to a centroid of the twice-projected higher points are above a second threshold.

6. The method of claim 2, wherein filtering the points corresponding to the pedestrian to remove lower points and keep only higher points comprises removing points whose height differences with respect to a highest point in the points corresponding to the pedestrian are above a first threshold.

7. The method of claim 6, wherein the first threshold is approximately 0.6 meter (m).

8. The method of claim 2, wherein determining a principal axis associated with the projected higher points comprises performing a singular value decomposition (SVD) or an eigenvalue decomposition on a covariance matrix.

9. A non-transitory machine-readable medium having instructions stored therein, which when executed by a processor, cause the processor to perform operations, the operations comprising:

detecting a pedestrian in a plurality of frames of point clouds generated by a LIDAR device installed at an autonomous driving vehicle (ADV);

in each of at least two of the plurality of frames of point clouds, generating a minimum bounding box enclosing points corresponding to the pedestrian and excluding points corresponding to limbs of the pedestrian;

estimating a moving speed of the pedestrian based at least in part on the minimum bounding boxes across the at least two of the plurality of frames of point clouds;

planning a trajectory for the ADV based at least on the moving speed of the pedestrian; and generating control signals to drive the ADV based on the planned trajectory.

10. The machine-readable medium of claim 9, wherein generating the minimum bounding box enclosing the points corresponding to the pedestrian and excluding points corresponding to limbs of the pedestrian further comprises:

filtering the points corresponding to the pedestrian to remove lower points and retain only higher points, the lower points corresponding to legs and feet of the pedestrian;

projecting the remaining higher points in the points corresponding to the pedestrian to a horizontal plane; and determining a principal axis associated with the projected higher points on the horizontal plane.

11. The machine-readable medium of claim 10, wherein the operations further comprise:

projecting the projected higher points on the horizontal plane to the principal axis; and filtering the twice-projected higher points to remove most outlying points in both directions of the principal axis, the most outlying points corresponding to arms and hands of the pedestrian.

12. The machine-readable medium of claim 11, wherein the operations further comprise:

determining a subset of points in the points corresponding to the pedestrian that correspond to the remaining twice-projected higher points; and generating a minimum bounding box enclosing the subset of points, the minimum bounding box enclosing the subset of points being the minimum bounding box enclosing the points corresponding to the pedestrian and excluding points corresponding to limbs of the pedestrian.

13. The machine-readable medium of claim 11, wherein filtering the twice-projected higher points to remove most outlying points in both directions of the principal axis comprises removing points whose distances to a centroid of the twice-projected higher points are above a second threshold.

14. The machine-readable medium of claim 10, wherein filtering the points corresponding to the pedestrian to remove lower points and keep only higher points comprises removing points whose height differences with respect to a highest point in the points corresponding to the pedestrian are above a first threshold.

15. The machine-readable medium of claim 14, wherein the first threshold is approximately 0.6 meter (m).

16. The machine-readable medium of claim 10, wherein determining a principal axis associated with the projected higher points comprises performing a singular value decomposition (SVD) or an eigenvalue decomposition on a covariance matrix.

17. A data processing system, comprising:

a processor; and a memory coupled to the processor to store instructions, which when executed by the processor, cause the processor to perform operations, the operations including:

detecting a pedestrian in a plurality of frames of point clouds generated by a LIDAR device installed at an autonomous driving vehicle (ADV);

in each of at least two of the plurality of frames of point clouds, generating a minimum bounding box enclosing points corresponding to the pedestrian and excluding points corresponding to limbs of the pedestrian;

estimating a moving speed of the pedestrian based at least in part on the minimum bounding boxes across the at least two of the plurality of frames of point clouds;

planning a trajectory for the ADV based at least on the moving speed of the pedestrian; and generating control signals to drive the ADV based on the planned trajectory.

18. The system of claim 17, wherein generating the minimum bounding box enclosing the points corresponding to the pedestrian and excluding points corresponding to limbs of the pedestrian further comprises:

filtering the points corresponding to the pedestrian to remove lower points and retain only higher points, the lower points corresponding to legs and feet of the pedestrian;

projecting the remaining higher points in the points corresponding to the pedestrian to a horizontal plane; and determining a principal axis associated with the projected higher points on the horizontal plane.

19. The system of claim 18, wherein the operations further comprise:

projecting the projected higher points on the horizontal plane to the principal axis; and filtering the twice-projected higher points to remove most outlying points in both directions of the principal axis, the most outlying points corresponding to arms and hands of the pedestrian.

20. The system of claim 19, wherein the operations further comprise:

determining a subset of points in the points corresponding to the pedestrian that correspond to the remaining twice-projected higher points; and generating a minimum bounding box enclosing the subset of points, the minimum bounding box enclosing the subset of points being the minimum bounding box enclosing the points corresponding to the pedestrian and excluding points corresponding to limbs of the pedestrian.

\* \* \* \* \*